(12) United States Patent
Paul et al.

(10) Patent No.: US 12,151,750 B2
(45) Date of Patent: Nov. 26, 2024

(54) VEHICLE SYSTEM AND METHOD FOR CARGO TRANSLOADING

(71) Applicant: Transportation IP Holdings, LLC, Norwalk, CT (US)

(72) Inventors: Anthony D. Paul, Anchorage, AK (US); Nathan Thomas North, Seattle, WA (US); Milan Karunaratne, Orange, CA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 198 days.

(21) Appl. No.: 17/450,139

(22) Filed: Oct. 6, 2021

(65) Prior Publication Data

US 2023/0106232 A1    Apr. 6, 2023

(51) Int. Cl.
*B62D 53/06* (2006.01)
(52) U.S. Cl.
CPC .................................. *B62D 53/067* (2013.01)
(58) Field of Classification Search
CPC ...... B60D 1/00; B62D 53/005; B62D 53/067; B60P 1/52; Y02T 30/00
USPC .................................. 280/405.1, 408, 411.1
See application file for complete search history.

(56) References Cited

U.S. PATENT DOCUMENTS

| 3,262,588 | A | * | 7/1966 | Davidson | B64D 9/003 414/536 |
| 3,958,701 | A | * | 5/1976 | Yatagai | B66F 9/12 414/349 |
| 10,919,428 | B2 | * | 2/2021 | Wallace | B60R 5/041 |
| 2016/0107560 | A1 | * | 4/2016 | Thygesen | B62D 33/08 296/37.6 |
| 2023/0106232 | A1 | | 4/2023 | Paul et al. | |

* cited by examiner

*Primary Examiner* — Minnah L Seoh
*Assistant Examiner* — Felicia L. Brittman-Alabi
(74) *Attorney, Agent, or Firm* — K&L Gates LLP

(57) ABSTRACT

A vehicle according to a vehicle system and method includes a chassis, a coupler, and a platform on the chassis. The coupler is mounted to the chassis at a first end of the chassis and is configured to releasably connect the vehicle to a second vehicle. The platform is for supporting a cargo container and includes a base portion and a bridge member. The bridge member is located at an end of the platform and is extendable relative to the base portion from a retracted position to an extended position to lengthen the platform. The bridge member in the extended position projects beyond the first end of the chassis, above the coupler, towards the second vehicle for establishing a bridge to transload the cargo container from the platform to the second vehicle.

17 Claims, 9 Drawing Sheets

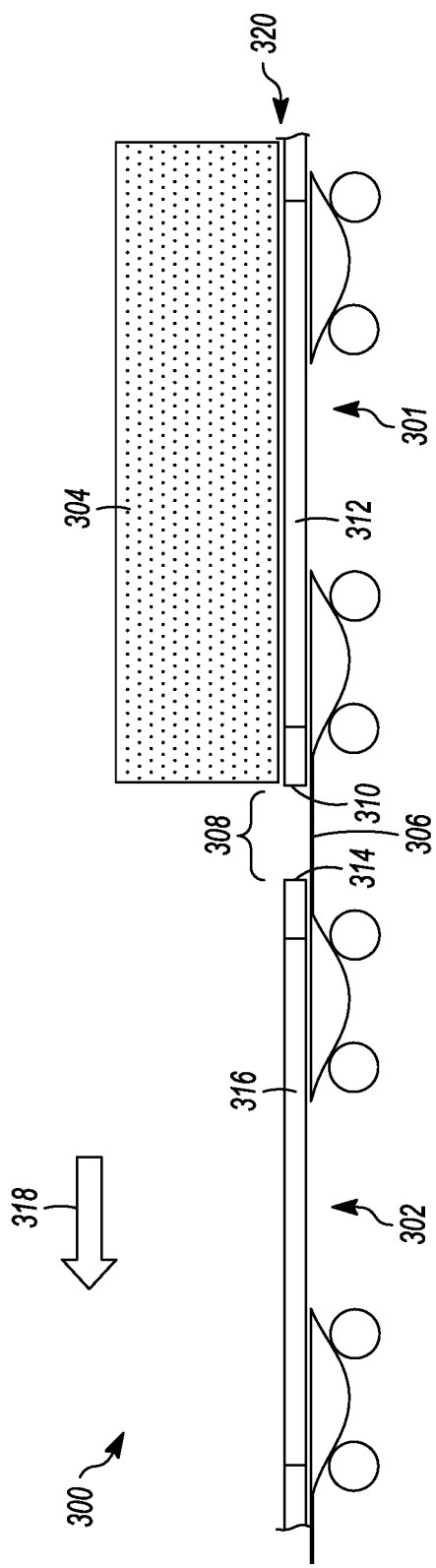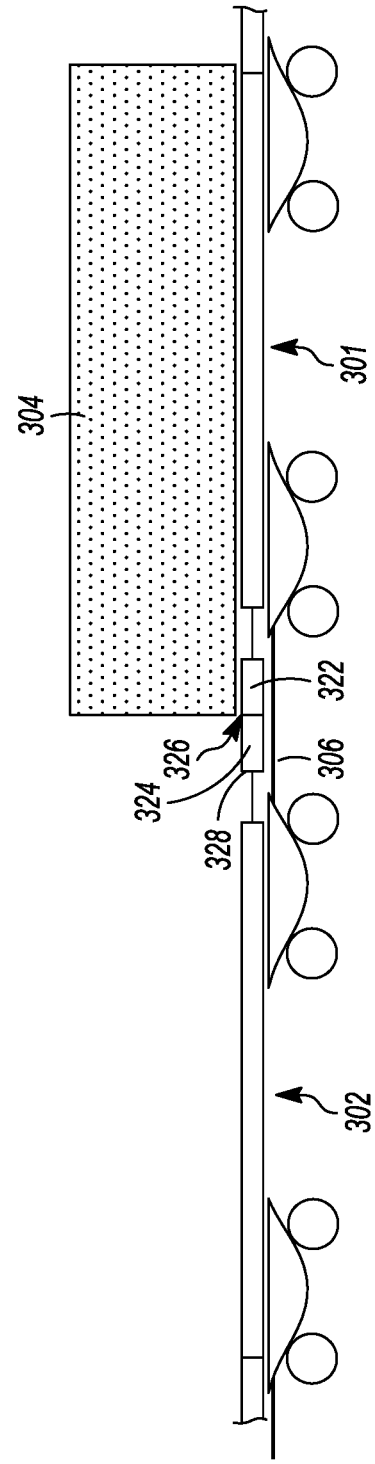
FIG. 3A
FIG. 3B

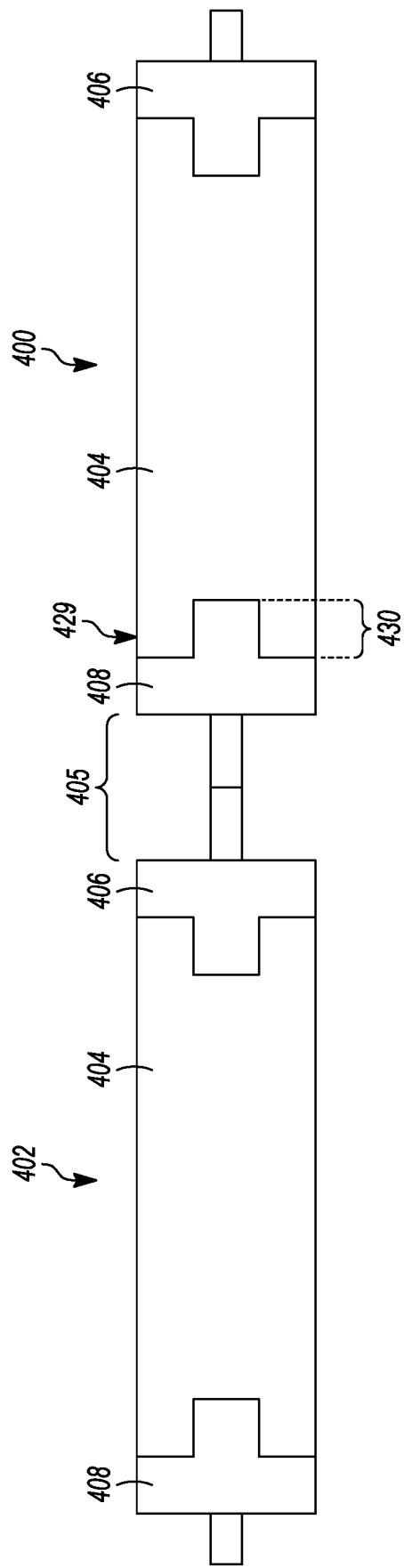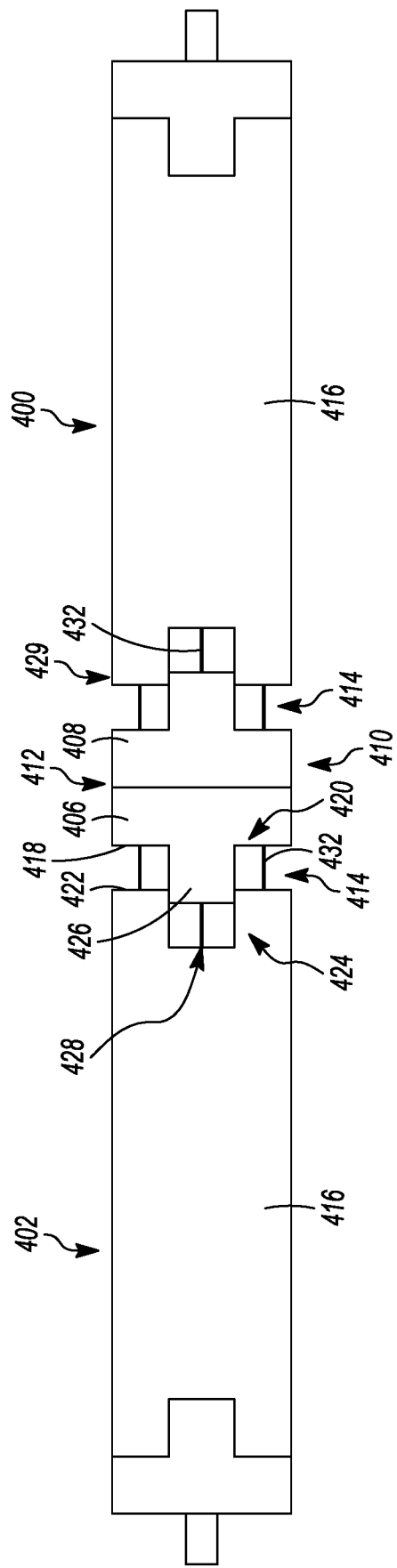
FIG. 4A
FIG. 4B

VEHICLE SYSTEM AND METHOD FOR CARGO TRANSLOADING

BACKGROUND

Technical Field

The subject matter described herein relates to systems and methods that transload (e.g., move) cargo on, off, and between vehicles.

Discussion of Art

Some vehicle systems haul cargo between various pickup and drop-off locations. For example, freight trains may include hundreds of flatbed railcars that carry intermodal cargo containers. During a trip, a freight train may stop at several terminal facilities to drop off different cargo containers. At the terminal facility, gantry cranes and other transloading equipment are typically required to lift and remove each container from the corresponding railcar. One drawback of this system is that the freight train is dependent on the availability of the transloading equipment. For example, to drop off a container, the freight train may have to travel to the nearest facility with available, operating transloading equipment, which may be out of the way from a desired route of the train and/or a desired drop-off location for the container. Once the freight train arrives at the facility, the freight train has to remain at the facility until the transloading equipment is available to lift and remove designated cargo containers from the train, which has the potential to delay the trip.

Additionally, the transloading equipment at the facility may extract a cargo container from a railcar without taking containers from adjoining railcars, which results in an empty railcar between two loaded railcars. The empty railcar may not be needed for future segments of the trip. But, due to the railcar being bounded on both ends, uncoupling the empty railcar from the train would require breaking down the train into segments to access and uncouple the empty railcar, and then reforming the train. Breaking down the train to remove empty railcars is generally undesirable due to the necessary time and effort involved. Typically, a freight train that includes one or more empty railcars within the middle portion of the train will simply continue the trip with the empty railcars in tow. The drawback of this approach is that the empty railcars add to the weight and length of the train, thereby reducing the energy efficiency of the trip, limiting the acceleration and braking capabilities, and the like, without serving to transport cargo. It may be desirable to have a system and method that differs from those that are currently available.

BRIEF DESCRIPTION

In one or more embodiments, a vehicle (e.g., a transloading vehicle) is provided that includes a chassis, a coupler, and a platform on the chassis. The coupler is mounted to the chassis at a first end of the chassis and is configured to releasably connect the vehicle to a second vehicle. The platform is for supporting a cargo container and includes a base portion and a bridge member. The bridge member is located at an end of the platform and is extendable relative to the base portion from a retracted position to an extended position to lengthen the platform. The bridge member in the extended position projects beyond the first end of the chassis, above the coupler, towards the second vehicle for establishing a bridge to transload the cargo container from the platform to the second vehicle.

In one or more embodiments, a vehicle system is provided that includes a first vehicle and a second vehicle connected to each other via first and second couplers, respectively. Each of the first and second vehicles includes a platform and one or more bridge actuators. The one or more bridge actuators are connected to a bridge member at an end of the platform to move the bridge member, relative to a base portion of the platform, from a retracted position to an extended position in which the bridge member projects above the first and second couplers. The vehicle system also includes a controller including one or more processors and operably connected to the one or more bridge actuators of each of the first and second vehicles. The controller is configured to generate a control signal to control the one or more bridge actuators of the first and second vehicles to extend the bridge members to the extended position. The bridge members in the extended position mechanically connect to each other to form a bridge above the first and second couplers for transloading a cargo container from the platform of the first vehicle to the platform of the second vehicle.

In one or more embodiments, a method for vehicle transloading of cargo is provided. The method includes controlling one or more bridge actuators of a first vehicle to extend a bridge member of a platform of the first vehicle from a retracted position to an extended position. The bridge member in the extended position projects beyond a first end of a chassis of the first vehicle, above a coupler of the first vehicle, and towards a second vehicle that is connected to the first vehicle via the coupler. The bridge member is disposed closer to the second vehicle when in the extended position than when in the retracted position to form at least a portion of a bridge between the platform of the first vehicle and a platform of the second vehicle for transloading a cargo container between the first and second vehicles.

BRIEF DESCRIPTION OF THE DRAWINGS

The inventive subject matter may be understood from reading the following description of non-limiting embodiments, with reference to the attached drawings, wherein below:

FIG. 3A illustrates a first transloading vehicle, holding a cargo container, and a second transloading vehicle that is non-loaded, according to an embodiment;

FIG. 3B shows an initial stage in a transloading operation between the first and second transloading vehicles according to an embodiment;

FIG. 4A is a top-down plan view of two connected transloading vehicles according to an embodiment;

FIG. 4B is a top-down plan view of the connected transloading vehicles of FIG. 4A, with a bridge extending between the vehicles according to an embodiment;

DETAILED DESCRIPTION

Figure 1:
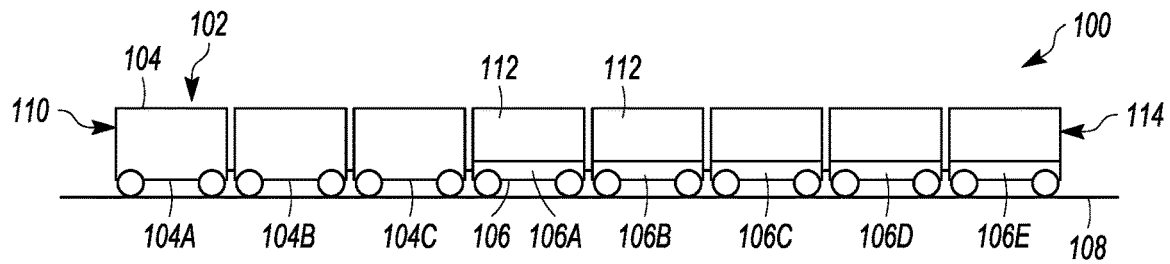
FIG. 1 illustrates a vehicle system that performs cargo transloading according to one or more embodiments.

One or more embodiments described herein are directed to a system and method for transloading cargo relative to one or more vehicles. In one aspect, the cargo may be moved without lifting or lowering the cargo. Alternatively, the cargo may be lifted or lowered while transloading the cargo. Transloading includes moving a cargo container onto a vehicle, off a vehicle, and/or between two vehicles. The cargo container may include any housing or receptacle for holding objects. The cargo container can include or represent an intermodal container, a pallet, a box, or the like. In at least one embodiment, the cargo transloading is performed by one or more vehicles of a vehicle system. Off-board equipment, such as cranes, container lift trucks, fork lifts, or the like, may not be utilized, which enables the cargo transloading operation to be independent from the proximity to and availability of such equipment. As a result, the cargo transloading may be performed outside of a transport facility that has transloading equipment.

A vehicle system according to an embodiment may include at least one vehicle that is designed to move a container from a platform of the vehicle off the platform onto another vehicle and/or to receive a container onto the platform from another vehicle. Such vehicles are referred to herein as self-transloading vehicles. The vehicle system may have multiple self-transloading vehicles coupled in series along a length of the vehicle system. The self-transloading vehicles may be capable of passing a given container from one such vehicle to another, front-to-back and/or back-to-front. With the vehicle system described herein, if there is a non-loaded self-transloading vehicle within the middle portion of the vehicle system (e.g., due to a cargo container being pulled from the vehicle by off-board equipment), the gap at the middle of the vehicle system may be filled by shifting containers from the rear of the vehicle system forward. The non-loaded self-transloading vehicle receives the container that was disposed on the adjacent vehicle to the rear, and the self-transloading vehicle located at the rear of the series of self-transloading vehicles becomes empty. The non-loaded self-transloading vehicle at the rear may be able to be decoupled from the vehicle system without breaking down the vehicle system. The uncoupled vehicle can be left behind from future segments of the trip of the vehicle system, thereby reducing the weight and length of the vehicle system and improving the energy efficiency and handling (e.g., acceleration and braking). The uncoupled vehicle may enter an available pool of vehicles that can be picked up by other vehicle systems.

In another use case, it may be desirable to add a container to a middle portion of a vehicle system. For example, the container to be added may be associated with other cargo containers in the middle portion, such that the associated cargo containers may have a common destination location and/or may be grouped together when the vehicle system is separated into component vehicles. To accomplish this task, a non-loaded self-transloading vehicle may be coupled to the end of the series of self-transloading vehicles, if not already present. Then, the self-transloading vehicles, disposed between the newly-added vehicle and the desired location for the container to be added, perform the transloading operation to shift containers rearward. The newly-added vehicle receives the container that was previously held on the adjacent vehicle in front. The shift of containers yields a non-loaded vehicle at the desired location for the container. The new container may be loaded onto the empty vehicle via a gantry crane or other transloading equipment. Alternatively, the new container may be transloaded from another vehicle system along the side of the vehicle system, rather than lifted onto the vehicle via a crane or truck.

The cargo transloading system and method disclosed herein enables greater flexibility in adding and removing cargo containers on a vehicle system, and arranging the cargo containers on the vehicle system because the cargo containers can be moved from vehicle to vehicle. Because the cargo containers can be linearly shifted to fill an empty vehicle along a middle portion of the vehicle system and yield an empty vehicle at an end of the vehicle system, at least one technical effect is the ability to add and remove vehicles at the end of the vehicle without breaking down the vehicle system to access the middle portion. Another technical benefit is the non-reliance on transloading equipment and terminal facilities. For example, the vehicle system may be able to avoid traveling to a terminal facility because the vehicle system can shift the containers and then drop off the end vehicle along a side of the route to be later picked up by another vehicle system. The vehicle system may be able to complete a trip in less time by bypassing a terminal facility and a transloading operation performed by equipment at the facility. Yet another benefit is that the self-transloading provides greater control over the weight of the vehicle system (by enabling dropping off vehicles to reduce weight), the weight distribution of the vehicle system along its length, wind effects (e.g., by eliminating stack gaps), and the like, relative to conventional vehicles that cannot self-transload cargo containers between vehicles. The enhanced control over these characteristics of the vehicle system may result in improved energy efficiency, faster travel times, and improved handling (e.g., acceleration and braking) of the vehicle system.

FIG. 1 illustrates a vehicle system 100 that performs cargo transloading according to one or more embodiments described herein. The vehicle system includes several types of vehicles 104, 106 that travel along a route 108. The vehicles 104A-C are propulsion-generating vehicles that generate tractive effort and/or power to propel the vehicle system along the route. The vehicles 106A-E are non-propulsion-generating vehicles that do not generate tractive effort or power. Some of the non-propulsion-generating vehicles may be disposed between propulsion-generating vehicles. The non-propulsion-generating vehicles include brake systems but lack propulsion systems. The non-propulsion-generating vehicles may be mechanically coupled to each other and to the propulsion-generating vehicles, such that the propulsion-generating vehicles propel the non-propulsion-generating vehicles along the route.

The non-propulsion-generating vehicles may be designed to carry cargo containers 112. Suitable cargo containers include intermodal containers, boxes, crates, pallets, and the like. The cargo containers can represent any form of packaging or containment of goods. The non-propulsion-generating vehicles may be flatbed vehicles that provide platforms on which the cargo containers are mounted. Although the vehicle system is illustrated with three propulsion-generating vehicles and five non-propulsion-generating vehicles, the vehicle system can have more or less propulsion-generating vehicles and more or less non-propulsion-generating vehicles by coupling additional vehicles and/or uncoupling and removing some of the existing vehicles. For example, the vehicle system may have a few as one propulsion-generating vehicle and as few as one or two transloading vehicles.

At least some of the non-propulsion-generating vehicles of the vehicle system are self-transloading vehicles, referred to herein as transloading vehicles. Optionally, all five non-propulsion-generating vehicles are transloading vehicles and replicas of each other. The transloading vehicles are capable of performing cargo transloading operations described herein. Alternatively, one or more of the non-propulsion-generating vehicles are not transloading vehicles. For example, the vehicle system may be assembled using both conventional non-propulsion-generating vehicles and the transloading vehicles.

Two or more of the transloading vehicles may be disposed (immediately) adjacent to each other along the length of the vehicle system. Arranging the transloading vehicles in series enables the transloading vehicles to pass cargo containers between the vehicles, without lifting the cargo containers. In the illustrated embodiment, the propulsion-generating vehicles are arranged in a consist 102 at a front end 110 of the vehicle system, according to a planned direction of travel of the vehicle system. The non-propulsion-generating vehicles, including the transloading vehicles, may be disposed rearward of the consist 102. For example, one or more transloading vehicles may be disposed at a rear end 114 of the vehicle system, that is opposite the front end. Positioning transloading vehicles at the rear enables the ability to transload a cargo container onto a non-loaded transloading vehicle at the end of the vehicle system. It also enables transloading a cargo container off of the transloading vehicle to the adjacent transloading vehicle, which frees the vehicle at the end to be disconnected from the vehicle system and dropped off and/or to receive another cargo container. Vehicles that are adjacent to each other refers to two vehicles that are not separated from each other by any intervening vehicle. In the illustrated embodiment, the vehicles that are adjacent to each other are directly mechanically coupled to each other.

In one embodiment, the vehicle system is a train, and the route is a railroad track. The propulsion-generating vehicles are locomotives. The non-propulsion-generating vehicles, including the transloading vehicles, may be railcars that carry cargo. In another embodiment, the vehicle system is a road train, and the route is a paved road or unpaved path. For example, the propulsion-generating vehicles may be trucks (e.g., highway semi-trucks, mining trucks, logging trucks, or the like), and the non-propulsion-generating vehicles, including the transloading vehicles, may be trailers coupled to the trucks. In yet other embodiments, the vehicles may be other types of vehicles such as vans, cars, water vessels (e.g., barges), and the like, which may be mechanically connected.

Figure 2A:
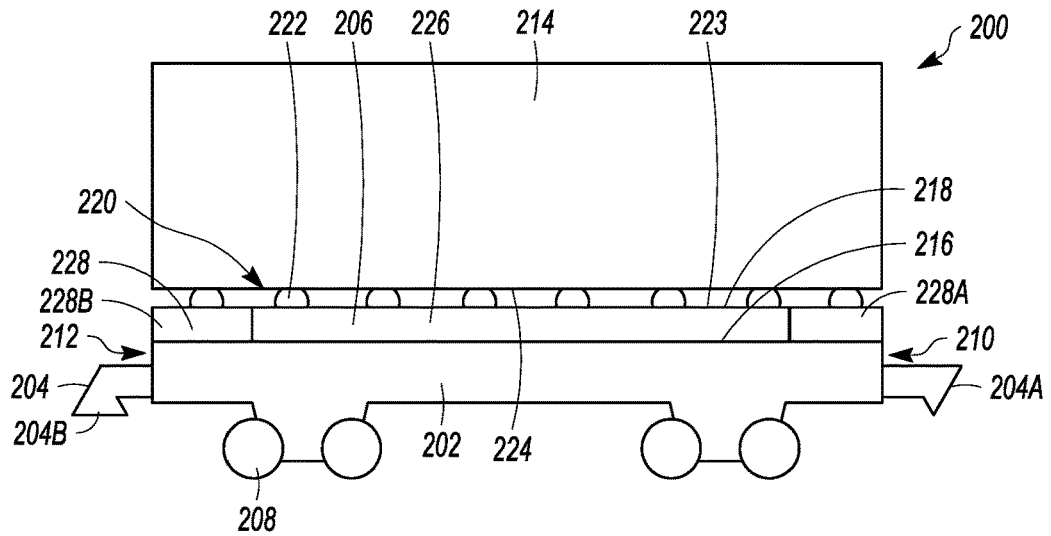
FIG. 2A illustrates a side view of a transloading vehicle according to an embodiment.

FIG. 2A illustrates a side view of a transloading vehicle 200 according to an embodiment. The transloading vehicle may be a non-propulsion-generating vehicle, such as one of the non-propulsion-generating vehicles of the vehicle system in FIG. 1. The transloading vehicle (also referred to herein as vehicle) includes a chassis 202, at least one coupler 204, and a platform 206. The chassis is coupled to at least one set of wheels 208. The wheels enable the vehicle to move by rolling along a route, such as a rail, a road, a path, or the like. The chassis in the illustrated embodiment is coupled to four sets of wheels, with only one wheel of each set visible in the side view. The wheels optionally may be coupled together in groups within trucks, such as two sets of wheels in each of two trucks.

The chassis longitudinally extends from a first end 210 of the chassis to a second end 212 that is opposite the first end. The vehicle includes a first coupler 204A mounted to the first end of the chassis and a second coupler 204B mounted to the second end of the chassis. The couplers are each configured to releasably mechanically connect (e.g., couple) to another vehicle to tether the transloading vehicle to at least a second vehicle. If the second vehicle is also a transloading vehicle, then the two vehicles can perform inter-vehicle cargo container transloading.

The platform is mounted to the chassis and holds and supports a cargo container 214. For example, the platform may be mounted to a top side 216 of the chassis. The cargo container may be disposed on a top side 218 of the platform. The platform may be generally flat and planar. A size of the platform in area along the longitudinal and lateral dimensions (e.g., not vertical) may be designed to be at least as large as the cargo container or containers carried on the platform.

The platform may include an array 220 of roller devices 222. The roller devices may include cylindrical rollers, spherical balls, wheels, or the like. The array is located along a top surface 223 of the platform. The top surface is the surface along at least a portion of the top side of the platform. The roller devices of the array may be spaced along at least a majority if not an entirety of the length of the platform. The roller devices may physically engage a bottom surface 224 of the cargo container. The roller devices may support at least some of the weight of the cargo container. In the illustrated embodiment, the cargo container rests on the array of roller devices, and the container is at least slightly elevated off of the platform, separated from the platform top surface. To move (e.g., slide) the cargo container relative to the vehicle when disposed on the platform, the roller devices may rotate (e.g., roll, spin, etc.). The array of roller devices may enable the cargo container to move with less force applied to the cargo container than if the cargo container is fully supported by the static top surface of the platform.

In an embodiment, at least some of the roller devices in the array are actively powered, referred to as powered rollers. The rotation of the powered rollers may be powered by the application of a torque applied to the powered rollers via one or more motors. The motors, gears, and other mechanical linkages of the array may be disposed within a thickness of the platform beneath the platform top surface. The powered rollers may be selectively activated to force the cargo container, via the points of contact along the bottom surface of the container, to move in a controlled direction for a transloading operation. The array may also include passive roller devices that are not powered. The passive roller devices, when in an unlocked state, rotate when contacted by the bottom surface of the cargo container. When a transloading operation is not taking place, such as when the vehicle is in motion, the array of roller devices may be locked to prevent rotation of the roller devices. Optionally, the array of roller devices may retract after a transloading operation to enable the cargo container to rest directly on the top surface of the platform.

The platform includes a base portion 226 and at least one bridge member 228. In the illustrated embodiment, the platform includes a first bridge member 228A and a second bridge member 228B. The base portion is disposed between the first and second bridge members. The first bridge member is located at the first end 210 of the chassis. The second bridge member is located at the second end 212 of the chassis. The first and second bridge members may be colinear with the base portion. For example, the top surface of the platform may be defined by a top surface of the base portion and respective top surfaces of the first and second bridge members. The top surfaces of the bridge members may be flush (e.g., coplanar) with the top surface of the base portion to provide a smooth transition across the different segments along the length of the platform. Each of the first and second bridge members is extendable relative to the base portion from a retracted position to an extended position to lengthen the platform in the longitudinal dimension. Both bridge members are in the retracted position in FIG. 2A. One or both of the bridge members may transition to the extended position for a container transloading operation, and then may return to the retracted position after the transloading operation. The vehicle may travel with the bridge members in the retracted position.

Figure 2B:
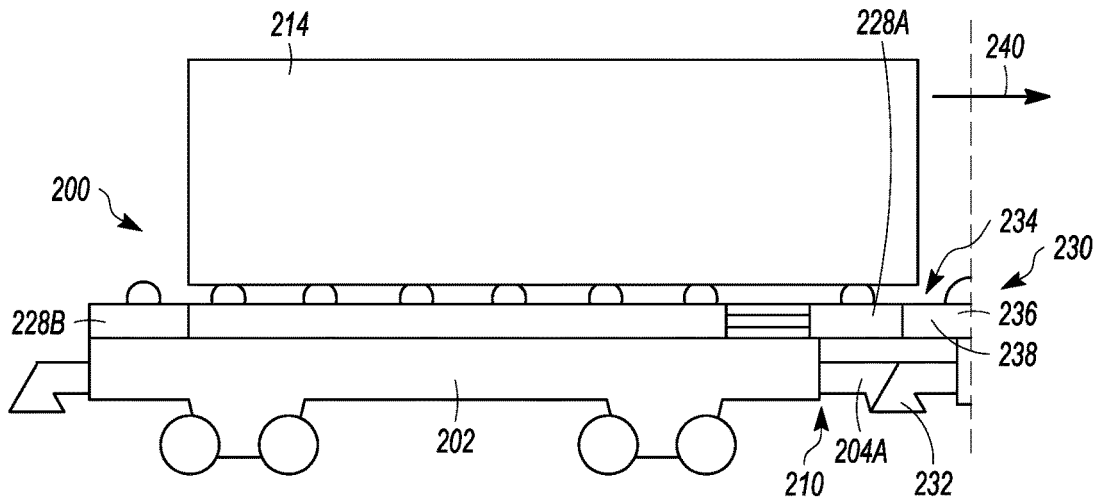
FIG. 2B illustrates a side view of the transloading vehicle in FIG. 2A showing the first bridge member in the extended position and the second bridge member in the retracted position.

FIG. 2B illustrates a side view of the transloading vehicle in FIG. 2A showing the first bridge member in the extended position and the second bridge member in the retracted position. In the extended position, the first bridge member projects beyond the first end of the chassis above the first coupler. For example, the first bridge member projects a greater distance beyond the first end of the chassis in the extended position than in the retracted position. At least a portion of the first bridge member extends above the first coupler, such that a vertical line (e.g., along a direction of gravity) through the coupler would intersect the first bridge member.

FIG. 2B shows the transloading vehicle coupled to a second transloading vehicle 230, of which only an end segment is shown. The second transloading vehicle may have a similar construction as the (first) transloading vehicle shown in FIG. 2A. The first coupler of the first vehicle is coupled to a coupler 232 of the second vehicle to enable the vehicles to travel together on a route. The illustrated embodiment shows the vehicles performing a transloading operation in which the cargo container 214 is moved from the first vehicle to the second vehicle, which is currently unoccupied or non-loaded. The first bridge member moves in a direction towards the second vehicle when transitioning from the retracted position to the extended position. In the extended position, the first bridge member forms at least a portion of a bridge 234 between the platform of the first vehicle and a platform 236 of the second vehicle. The bridge is located above the connected couplers. The bridge is used to transload the cargo container from the first vehicle to the second vehicle, without lifting the cargo container. In an embodiment, the first bridge member of the first vehicle defines a segment of the bridge, and a bridge member 238 of the second vehicle defines a remaining segment of the bridge. For example, the two bridge members may abut against each other and mechanically lock together to establish the bridge.

With the bridge in place, the cargo container is moved in a direction 240 towards the second vehicle such that the cargo container crosses the bridge. FIG. 2B shows an instance during the transloading operation in which the cargo container is beginning to cross the bridge. The movement may be propelled by the powered rollers of the array. The cargo container slides along the top side of the platform due to the rotating roller devices. One or more of the roller devices are disposed on the bridge members as well as the base portion, such that the container continues the "slide" along the bridge between the vehicles. Once the cargo container is conveyed across the bridge, the two bridge members of the connected vehicles may unlock, disconnect, and separate from each other as the bridge members retract to the respective retracted positions. In an embodiment, the bridge members, when in the retracted position, define segments of the platform to support the weight of the cargo container.

Figure 3C:
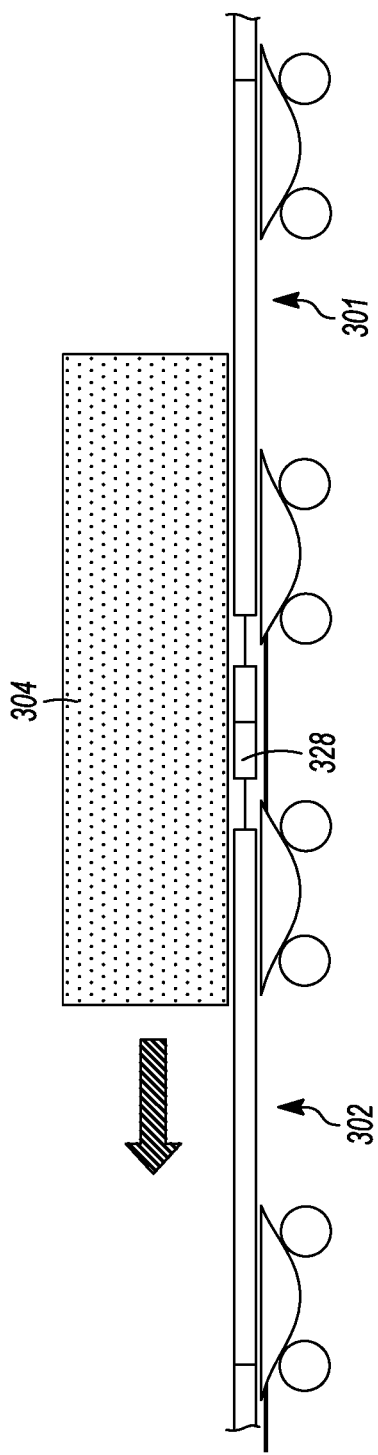
FIG. 3C shows an intermediate stage in the transloading operation in which the cargo container is located on both the first and second transloading vehicles.

FIGS. 3A-3F illustrate different instances of a cargo transloading operation in which a container is moved from a first transloading vehicle 301 of a vehicle system 300 to a second transloading vehicle 302 according to an embodiment. The first and second transloading vehicles in FIGS. 3A-3F may be the first and second transloading vehicles shown in FIG. 2B and/or may be two non-propulsion-generating vehicles of the vehicle system in FIG. 1. As shown in FIG. 3A, the first vehicle holds a cargo container 304 and the second vehicle is non-loaded (e.g., does not hold a cargo container). The first vehicle is mechanically connected to the second vehicle via a coupler set 306, including a coupler of the first vehicle and a complementary coupler of the second vehicle. There is a gap 308 between an end 310 of a platform 312 of the first vehicle and an end 314 of a platform 316 of the second vehicle. The gap is above the coupler set. The gap provides clearance to enable the vehicle system to turn and travel along curved routes without the platforms contacting each other.

The vehicle system is poised for traveling in FIG. 3A. In an embodiment, both the first and second vehicles are non-propulsion-generating vehicles that lack propulsion-generating equipment (e.g., traction motors, engines, drivetrains, etc.) onboard. The first and second vehicles may be coupled to at least one propulsion-generating vehicle, such as shown in FIG. 1, to provide tractive effort for propelling the first and second vehicles to travel on a route. Optionally, the second vehicle is disposed ahead of the first vehicle according to a planned direction of travel 318 of the vehicle system on the route. For example, the second vehicle may be disposed between the first vehicle and a propulsion-generating vehicle. Optionally, the first vehicle may represent a last or end vehicle of the vehicle system (e.g., a tail), such that no vehicle is connected to the first vehicle at the end 320 opposite the second vehicle.

FIG. 3B shows an initial stage in the transloading operation. Before the transloading operation begins, the vehicle system is verified as stationary. For example, the vehicle system may be slowed to a stop prior to initiating the transloading operation. In FIG. 3B, a first bridge member 322 of the first vehicle is actuated from the retracted position to the extended position. The first bridge member moves into the gap towards the second vehicle. A second bridge member 324 of the second vehicle is actuated from the retracted position to the extended position. The second bridge member moves into the gap towards the first vehicle. The first and second bridge members connect to one another at an interface 326. The connected bridge members define a bridge 328 across the gap between the two vehicles. The bridge is located above the coupler set.

The cargo container in FIG. 3B is offset from the initial position shown in FIG. 3A. The container is partially supported on the first bridge member within the gap. In on embodiment, the bridge is established by connecting and locking the bridge members together prior to moving the cargo container from the initial, loaded position shown in FIG. 3A. For example, once the bridge is verified, then the powered rollers of the array on the first vehicle may be activated to force the cargo container towards the second vehicle. In an alternative embodiment, the cargo container may be pulled from the initial, loaded position to the intermediate position in FIG. 3B by the movement of the first bridge member from the retracted position to the extended position. For example, the first bridge member may grip the cargo container with more friction than the base portion of the platform, so the movement of the first bridge member pulls the cargo container to the illustrated position.

FIG. 3C shows an intermediate stage in the transloading operation in which the cargo container is located on both the first and second vehicles. For example, a first portion of the container is supported by the base portion of the second vehicle platform, a second portion of the container is supported by the base portion of the first vehicle platform, and a third portion of the container is supported by the bridge, defined by the first and second bridge members. At this stage, the cargo container is being moved onto the second vehicle and off of the first vehicle. The movement may be powered by power rollers of the array onboard the first vehicle, power rollers of an array onboard the second vehicle, or the power rollers from both the first and second vehicles. The power rollers may be synchronized to translate the container at a constant, controlled speed.

Figure 3D:
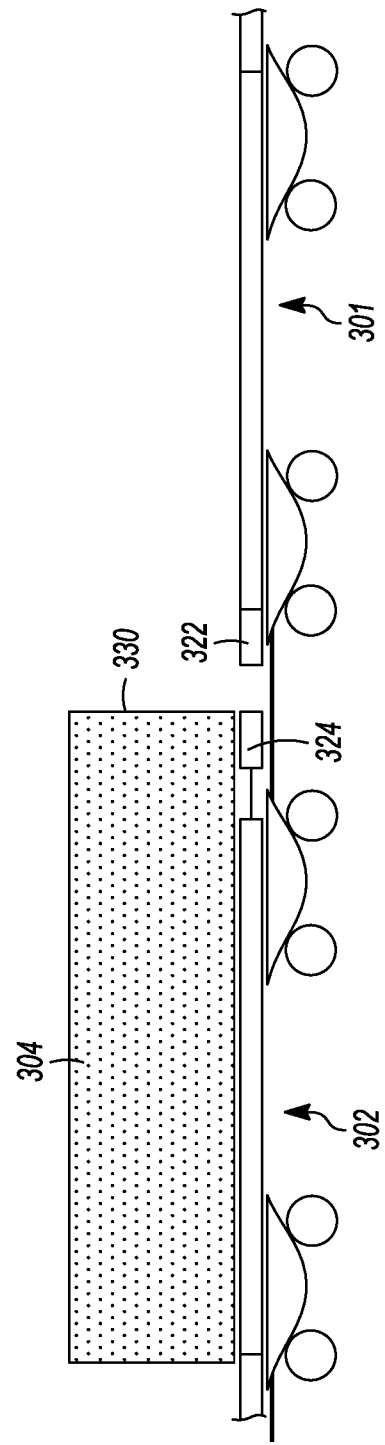
FIG. 3D shows a later stage in the transloading operation in which the cargo container is fully supported by the second transloading vehicle.

FIG. 3D shows a later stage in the transloading operation in which the cargo container is fully supported by the second vehicle. An end 330 of the container is disposed on the extended second bridge member of the second vehicle. The first bridge member of the first vehicle is shown in the retracted position. In an embodiment, once the container is no longer in contact with, or otherwise supported by, any portion of the first vehicle (including the first bridge member), then the first bridge member is retracted. For example, the first bridge member may unlock from the second bridge member, then separate from the second bridge member as the first bridge member moves towards the base portion of the first vehicle platform. In an alternative embodiment, the first bridge member remains locked to the second bridge member, providing the bridge, until the cargo container reaches a fully loaded position on the second vehicle. The container is not in the fully loaded position yet in FIG. 3D.

Figure 3E:
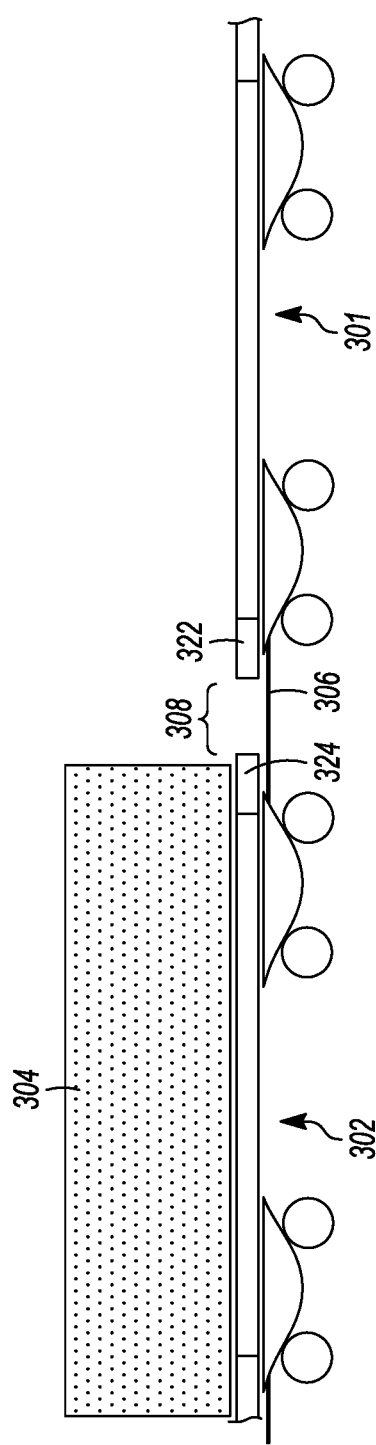
FIG. 3E shows the final result of the transloading process according to an embodiment.

FIG. 3E shows the final result of the transloading process. In FIG. 3E, the cargo container is in a fully loaded position on the second vehicle. The cargo container may be in the fully loaded position when the container is centered on the vehicle and/or when the container is at a location on the platform that is designated as the travel position for the container. Both the first bridge member of the first vehicle and the second bridge member of the second vehicle are in the retracted position, which once again established the gap between the vehicles above the coupler set. In the illustrated arrangement, the vehicle system is once again poised for travel. The first vehicle is now non-loaded. The vehicle system would be pulling a non-loaded vehicle at the tail end if the vehicle system departs with this configuration.

Figure 3F:
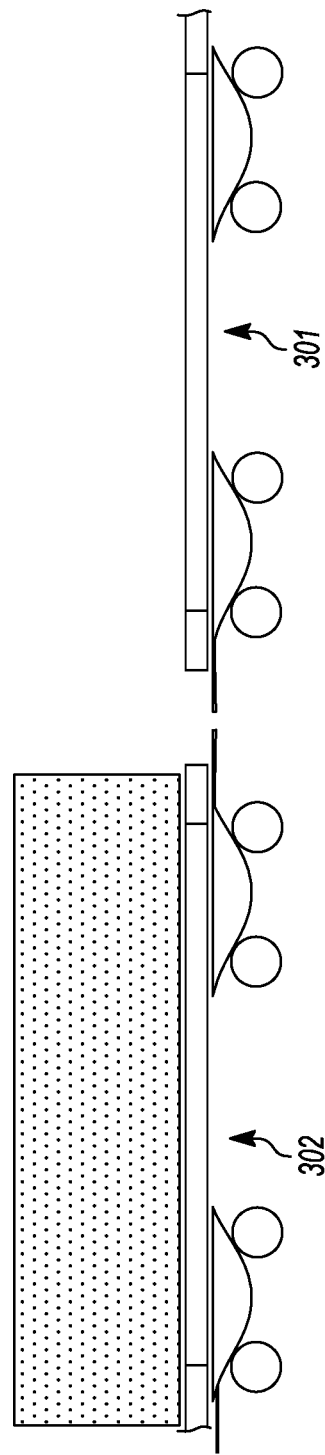
FIG. 3F shows the first transloading vehicle disconnected and separated from the second transloading vehicle after the transloading operation according to an embodiment.

FIG. 3F shows the first vehicle disconnected and separated from the second vehicle. One benefit of the transloading operation described herein is that cargo can be shifted to fill non-loaded vehicles in a middle portion of the vehicle system and yield empty vehicles at the end. Non-loaded vehicles at the end of the vehicle system can be disconnected and dropped from the vehicle system simply by disconnecting the coupler set. The entire vehicle system does not need to be broken down using transloading equipment to drop one or more non-loaded vehicles at the end. In an embodiment, the coupler set may be disconnected autonomously or semi-autonomously via electronic control of a coupling actuator that mechanically disconnects the mated couplers. The coupling actuator may pull a pin or the like. After separating the vehicles, the vehicle system may depart for a subsequent leg of a trip without the first vehicle. The first vehicle is left behind for use by another vehicle system and/or to be picked up again by the vehicle system during a return leg of the trip.

FIG. 4A is a top-down plan view of two connected transloading vehicles 400, 402 according to an embodiment. The transloading vehicles may be the first and second vehicles shown in FIGS. 3A-3F, the first and second vehicles in FIGS. 2A and 2B, and/or two of the non-propulsion-generating vehicles of the vehicle system in FIG. 1. In the illustrated embodiment, the two transloading vehicles are replicas or copies of each other, such that the vehicles have the same components and arrangement of components. The vehicles are shown in an empty state, without any cargo containers on the respective platform 404. The platforms of the two vehicles are separated by a gap 405. The following description refers to one of the two vehicles, although is applicable to both vehicles.

The vehicle includes a first bridge member 406 and a second bridge member 408 disposed at opposite ends of the platform. When the bridge members are both in the retracted position, the platform has an unbroken rectangular shape, defined along the longitudinal and lateral dimensions.

FIG. 4B is a top-down plan view of the connected transloading vehicles of FIG. 4A, with a bridge 410 extending between the vehicles according to an embodiment. The bridge is established by the two bridge members of the vehicles that face each other across the gap transitioning to the extended position. The bridge members mate and lock together at an interface 412. In an embodiment, the bridge members are segments of the platform and define part of the top surface of the platform. As such, when the bridge members move to the extended position, platform gaps 414 form between the bridge members and the base portion 416 of the platform. In an embodiment, an inner edge 418 of each bridge member has a first non-linear profile 420, and an outer edge 422 of the base portion has a second non-linear profile 424. The second non-linear profile is complementary to the first non-linear profile. For example, a protrusion 426 along the inner edge of the bridge member aligns with and is sized to fit within a recess 428 along the outer edge of the base portion. The complementary non-linear profiles define a keyed mating interface 429, in which the two non-linear profiles nest together when the bridge member is in the retracted position.

The keyed mating interface, when nested as shown in FIG. 4A, has a length 430 in the longitudinal dimension. In an embodiment, the length of the keyed mating interface is greater than a distance that the bridge member moves between the retracted and extended positions. This ensures that, even when in the extended position, a segment of the bridge member will overlap a segment of the base portion. As shown in FIG. 4B, along the length of the platform there is no crevice or channel formed into which a cargo container can get caught when sliding along the top side of the platform. For example, the leading edge of the container moves along the sections of the base portion on either side of the recess and then smoothly transitions to the protrusion of the bridge member, without dipping into any of the platform gaps that form between the bridge member and the base portion.

In an embodiment, the movement of each of the bridge members between the retracted and extended positions is supported and guided by rods 432. For example, the rods may be components of actuators, referred to herein as bridge actuators. The bridge actuators may be linear actuators that move the bridge member bidirectionally along a linear path. The bridge actuators may be hydraulic actuators, such that the extension of the rods may be controlled via hydraulic fluid. For example, the rods may be pistons held within and linearly translatable relative to respective cylinders. The hydraulic fluid pressure within the cylinder forces the piston in a direction away from the cylinder to control the extension of the bridge member from the base portion. Alternatively, the linear actuators may be electric instead of hydraulic. The rods may be designed with sufficient strength to support the weight of the portion of the container that engages the bridge during the transloading operation. In the illustrated embodiment, each bridge member is connected to the body portion via three rods, although more or less than three rods may be employed in other embodiments based on the strength requirements, component costs, available space on the vehicle, and the like.

Optionally, the vehicle may include a track system that supports at least some of the weight of the bridge member and the container. For example, first track elements may be mounted along sides of the protrusion of the bridge member. The sides are oriented to extend along the longitudinal and vertical dimensions. Complementary second track elements may be mounted to inner walls of the recess of the base portion. The inner walls of the recess face the sides of the protrusion. The first and second track elements may engage each other to support the extension and retraction of the bridge member, similar to the track system of a drawer. Optionally, the track system may be installed on outer side edges of the bridge member and the base portion, rather than to the protrusion and inner walls of the recess.

Although only one bridge member of each of the vehicles is in the extended position in FIG. 4B, each vehicle may be capable of extending both respective bridge members during a common time period. For example, the positioning of the first bridge member of the vehicle is independently controlled from the positioning of the second bridge member at the opposite end of the vehicle. A first transloading vehicle that is connected between a second transloading vehicle and a third transloading vehicle can establish a bridge with either or both of the second and third transloading vehicles.

Figure 5:
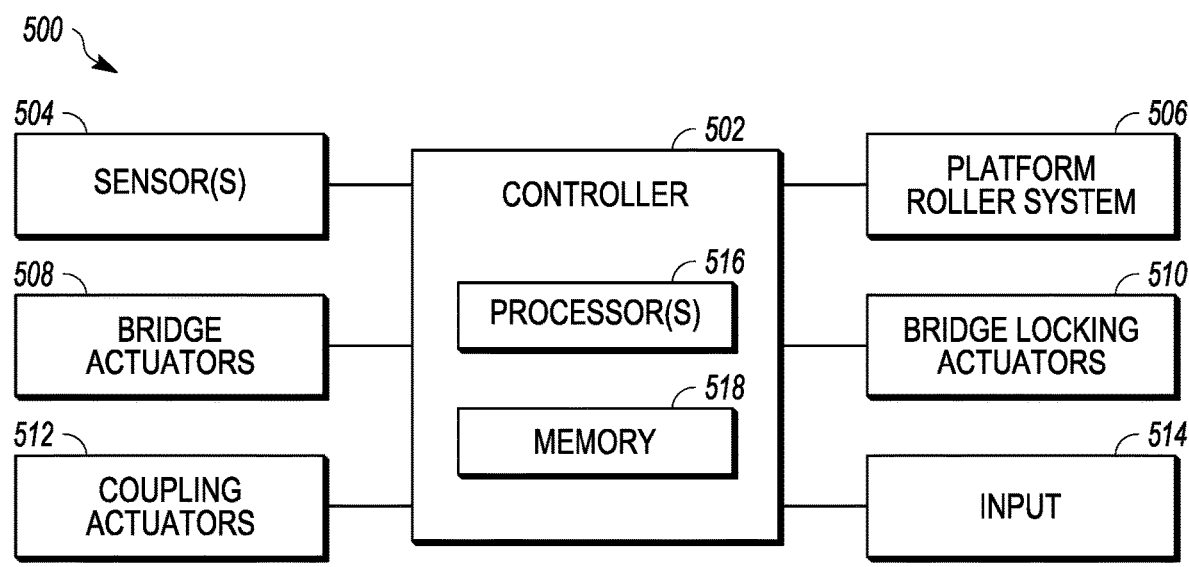
FIG. 5 is a block diagram of a transloading control system according to an embodiment.

FIG. 5 is a block diagram of a transloading control system 500 according to an embodiment. The transloading control system includes a controller 502, one or more sensors 504, a platform roller system 506, bridge actuators 508, bridge locking actuators 510, coupling actuators 512, and an input device 514. The controller is operably connected to the sensors, platform roller system, bridge actuators, bridge locking actuators, and coupling actuators. The controller can communicate via signals with each of the components. Some of the components are optional, such as the coupling actuators. The controller controls the transloading of a cargo container to or from a transloading vehicle, as described herein. The controller receives information from the sensors and/or the input device, and provides commands (e.g., control signals) to the roller system and/or various actuators.

The control system may include additional components. For example, the control system may include a communication device that enables the controller to communicate control signals to the actuators and/or roller systems on the transloading vehicles. The communication device may also be used to receive incoming information, such as sensor data generated by the sensors and/or user instructions from the input device.

The controller represents hardware circuitry that includes and/or is connected with one or more processors 516 (e.g., one or more microprocessors, integrated circuits, microcontrollers, field programmable gate arrays, etc.). The controller includes and/or is connected with a tangible and non-transitory computer-readable storage medium (e.g., memory) 518. The memory may store programmed instructions (e.g., software) that is executed by the one or more processors to perform the transloading operations of the controller described herein. For example, the controller may respond to stimulus, such as sensor data, according to the programmed instructions, which determine how to control the various actuators and other output devices. The memory additionally or alternatively may store different information, such as a vehicle system manifest that identifies the vehicles in the vehicle system and an order of the vehicles, a cargo database or record that identifies the cargo onboard the vehicle system and the location of the cargo, a travel schedule, a route database, and/or the like. In an embodiment, the controller is disposed onboard the vehicle system. The controller may be located in one of the propulsion-generating vehicles of the vehicle system shown in FIG. 1.

The platform roller system may include an array of roller devices, including at least some powered rollers. The platform roller system may be the same or similar to the array of roller devices shown in FIGS. 2A and 2B. The bridge actuators control the position of the bridge members relative to the base portion of the vehicle. The bridge actuators may power the movement of the bridge members. The bridge actuators may be linear actuators, as described with reference to FIG. 4B. The bridge locking actuators may be disposed on the bridge platforms. The bridge locking actuators may selectively lock one extended bridge member to another extended bridge member to strengthen the bridge and inhibit unintentional separation of the bridge members at the interface. The coupling actuators may be disposed on the couplers used to connect two vehicles together. The coupling actuators may be controlled to selectively uncouple two vehicle without manually approaching and manipulating the couplers.

The input device may be a computing device or a physical button, toggle, switch, or the like disposed within a propulsion-generating vehicle of the vehicle system shown in FIG. 1. An operator of the vehicle system may use the input device to send an instruction to initiate a transloading operation. The input device may also be used to select settings and/or parameters of the transloading operation, such as to identify which cargo container(s) to shift, a direction of the shift, and/or which transloading vehicles to use. The operator may also use the input device to select whether or not to drop off any non-loaded vehicles at the tail end of the vehicle system after the transloading operation. When the input device is a computing device, the input device may be hardwired into the propulsion-generating vehicle or alternatively may be a tablet, laptop, smartphone, or the like that is communicatively connected to the controller.

The one or more sensors may provide feedback to the controller during the transloading operation. For example, one or more sensors may generate sensor data indicative of the presence or absence of a cargo container on the platform of a transloading vehicle. Suitable sensors for this task include weight sensors, optical sensors, proximity sensors, and the like. Another one or more sensors may generate sensor data indicative of whether two bridge members are mechanically engaged and secured together to establish a bridge that is ready to support the cargo container. Such sensors may be capable of verifying that the two bridge members are locked together. Sensors that may be suitable include optical sensors, position sensors, audio sensors, and the like. Additional sensors can be used to monitor the movement, such as speed and direction, of the cargo container as propelled by the platform roller system.

In an embodiment, the controller may utilize the sensors to determine that a cargo container is present on the platform of a first transloading vehicle, and that a second transloading vehicle next to the first transloading vehicle is empty (e.g., not loaded with a cargo container). This situation is an opportunity for a transloading operation. The controller may receive a command or instruction to implement the transloading operation. The input device may be a source of the command. Alternatively, the transloading operation may be pre-planned, and stored in the memory. For example, a schedule may dictate that the transloading operation is performed once a certain cargo container is extracted from the vehicle system, once the vehicle system reaches a designated location, or the like.

The controller may initiate the operation by activating the respective bridge members of the first and second vehicles to extend towards each other. The controller then verifies that the bridge member of the first vehicle is connected to the bridge member of the second vehicle to form the bridge. The verification may be based on sensor data indicating that the bridge members are in physical contact. The controller may then control the bridge locking actuator to lock the bridge members together in the coupled state. After verifying that the bridge is assembled and locked, the controller then activates the powered rollers on the platform of the first vehicle. The power rollers are controlled by the controller to rotate in a direction that forces the cargo container to move in the direction of the bridge and the second vehicle. The controller may monitor the position and movement of the container as the container moves across the bridge to the second vehicle. Once the sensors indicate that the container is partially disposed on the second vehicle, the controller may activate the powered rollers on the platform of the second vehicle. The powered rollers force the leading portion of the container in the same direction as the powered rollers on the first vehicle. Eventually, the controller may detect, via sensor data, that the container is no longer supported by the platform of the first vehicle (including the bridge member thereof). In addition, or alternatively, the controller may verify that the container is in a fully loaded position on the platform of the second vehicle. In response to one or both of these events, the controller may unlock and retract the two bridge members. For example, the controller may control the bridge locking actuator to unlock the bridge members from each other, and may thereafter control the bridge actuators to retract the individual bridge members.

After the transloading operation is completed, the controller may perform one or more additional functions. For example, the controller may update a record of the locations of the cargo containers onboard the vehicle system. The record may be a train manifest or database. The record may be updated to reflect that the specific cargo container is now on Vehicle B instead of Vehicle A, on which the container was previously mounted. The variables A and B may represent a unique identifier, a number in line stretching the length of the vehicle system, or the like. The record is updated to ensure that cargo containers are not misplaced or mixed up.

In another example, the controller may update a weight distribution of the vehicle system. The controller may recalculate how the weight of the vehicle system is distributed along the length of the vehicle system. The weight distribution may be used as a factor when planning movement of the vehicle system. For example, autopilot software for determining tractive and brake settings for the vehicle system may use the weight distribution as an input. The software may be the TRIP OPTIMIZER System from Wabtec Corporation, which is an autopilot for rail vehicles. The vehicle system may initiate the transloading operation to control the weight distribution of the vehicle system. For example, a controller may shift the cargo onboard the vehicle system between the vehicles to provide a more even weight distribution than before any transloading operation. For example, the vehicle system may perform transloading to condense the weight towards a middle portion of the vehicle system, or alternatively to spread the weight along the length of the vehicle system for a linear weight distribution. The weight distribution can be modified using cargo transloading to control intra-train forces. For example, the intra-train forces may be controlled to reduce the forces exerted on the couplers between railcars.

In another example, after the transloading, the controller may actuate one or both of the connected couplers of the first and second vehicles to disconnect the two vehicles. The controller may generate the control signal to control the coupler actuator to release the couplers. Disconnecting the two vehicles enables the empty vehicle to be left behind as the vehicle system continues to travel along a route, reducing the weight of the vehicle system and providing an opportunity for the empty vehicle to be added to a different vehicle system. After dropping the non-loaded vehicle, the controller may update a vehicle manifest to indicate that the vehicle system no longer includes the vehicle that was dropped. This information can be used for accounting purposes, particularly if the vehicle that is dropped is part of a pool of vehicles that can be rented for use.

Figure 6A:
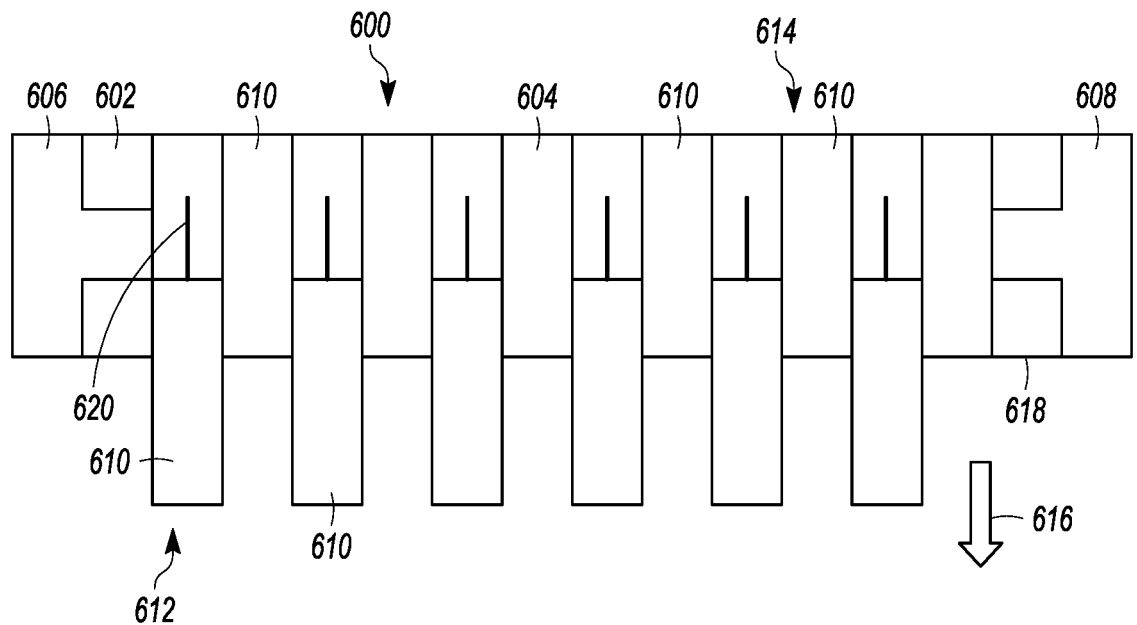
FIG. 6A is a top-down plan view of a transloading vehicle according to an embodiment.

FIG. 6A is a top-down plan view of a transloading vehicle 600 according to an embodiment. The transloading vehicle may represent any of the transloading vehicles described with reference to FIGS. 1 through 4B. The transloading vehicle 600 has a platform 602 for supporting one or more cargo containers. The platform includes a base portion 604 disposed between a first bridge member 606 and a second bridge member 608. The base portion 604 includes deck members 610 arranged in a first set 612 and a second set 614. The deck members are actuatable to move between a retracted position and an extended position. When transitioning to the extended position, the deck members in the first set extend, relative to the second set of deck members, in a first side-loading direction 616 to project beyond a first side 618 of the vehicle (e.g., the vehicle chassis). FIG. 6A shows the first set of deck members in the extended position and the second set of deck members in the retracted position. The deck members may be moved bidirectionally, along a linear path, by deck actuators. The deck actuators may include rods 620 or shafts, such as rods that project from a hydraulic cylinder. In the illustrated embodiment, the deck members in the first set alternate with the deck members in the second set. When the first set of deck members are in the extended position, a cargo container on the platform may be laterally off-loaded onto another vehicle or static platform disposed along the first side of the transloading vehicle, without lifting the cargo container or requiring offboard transloading equipment. For example, the transloading vehicle may include an array of roller devices along the top side of the platform, including on both the first and second sets of deck members. At least some of the roller devices may be powered to propel lateral movement of the container.

Figure 6B:
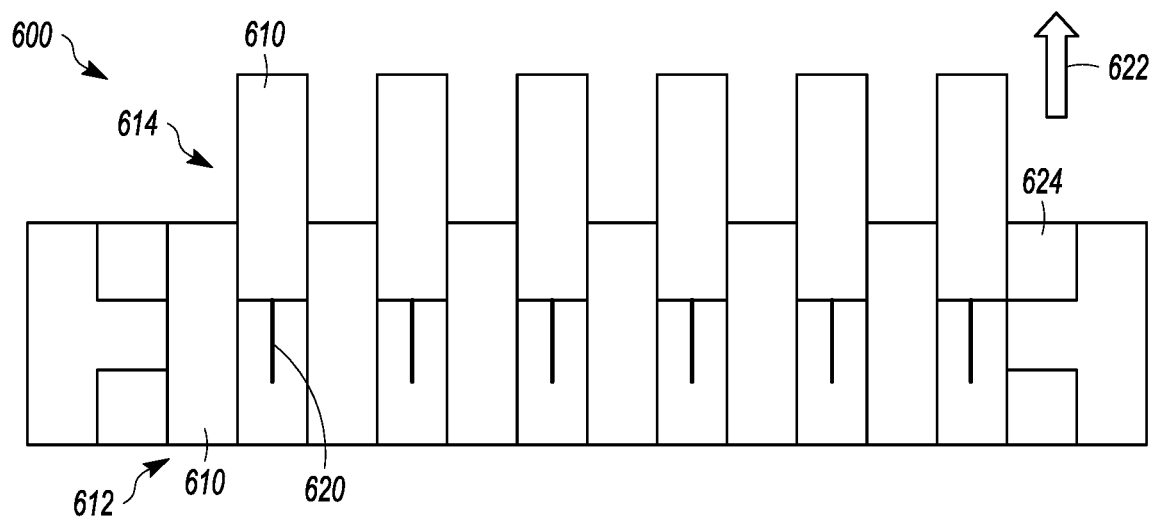
FIG. 6B is a second top-down plan view of the transloading vehicle shown in FIG. 6A.

FIG. 6B is a second top-down plan view of the transloading vehicle shown in FIG. 6A. In FIG. 6B, the second set of deck members are in the extended position, and the first set is in the retracted position. When transitioning to the extended position, the deck members in the second set extend, relative to the first set of deck members, in a second side-loading direction 622 to project beyond a second side 624 of the vehicle (e.g., the vehicle chassis). The second side is opposite the first side. When the second set of deck members are in the extended position, a cargo container on the platform may be laterally off-loaded onto another vehicle or static platform disposed along the second side of the transloading vehicle, without lifting the cargo container or requiring offboard transloading equipment.

Figure 7:
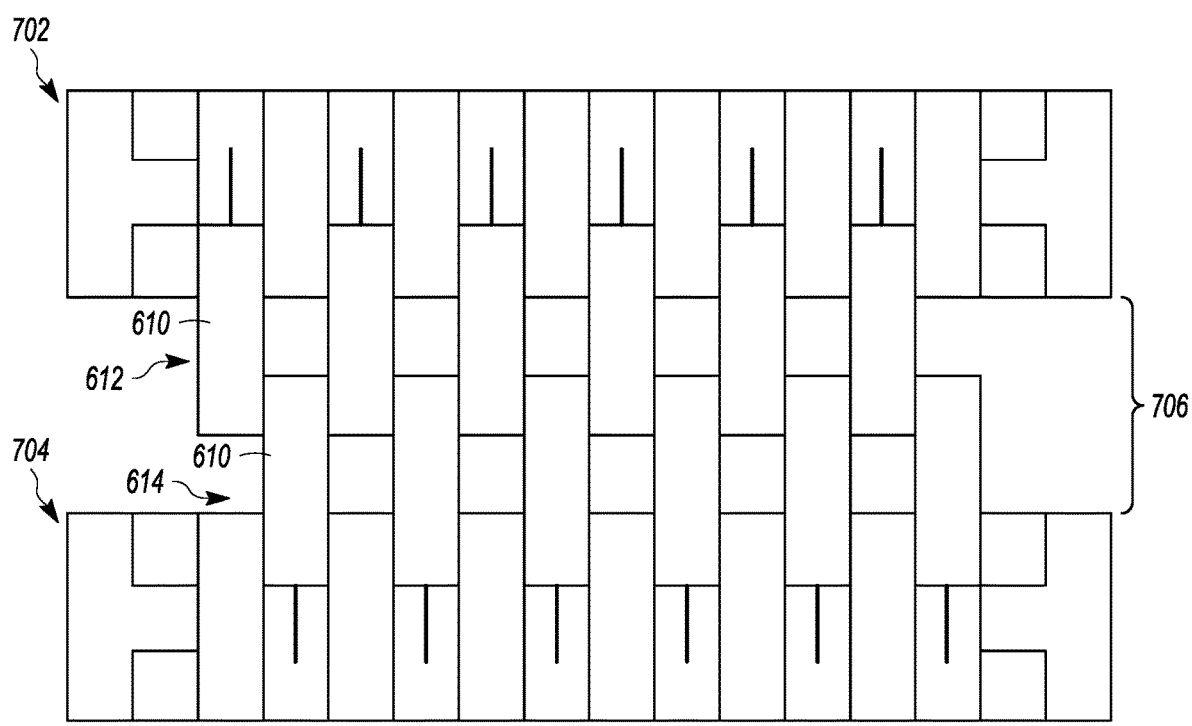
FIG. 7 is a top-down plan view of two transloading vehicles, according to an embodiment, disposed side by side rather than end to end.

FIG. 7 is a top-down plan view of two transloading vehicles 702, 704 disposed side by side, rather than end to end. Each of the two vehicles may represent the transloading vehicle shown in FIGS. 6A and 6B. The first transloading vehicle 702 has the deck members of the first set in the extended position, projecting beyond the first side of the respective vehicle chassis towards the second transloading vehicle 704. The second transloading vehicle has the deck members of the second set in the extended position, projecting beyond the second side of the respective vehicle chassis towards the first transloading vehicle. The extended deck members of the two vehicles at least partially overlap and define a bridge 706 that enables side-to-side transloading of a cargo container between the two vehicles. The vehicles may be located on two different routes and may belong to separate and discrete vehicle systems, yet the vehicles may be capable of transferring cargo via the extended deck members and the roller systems.

Figure 8:
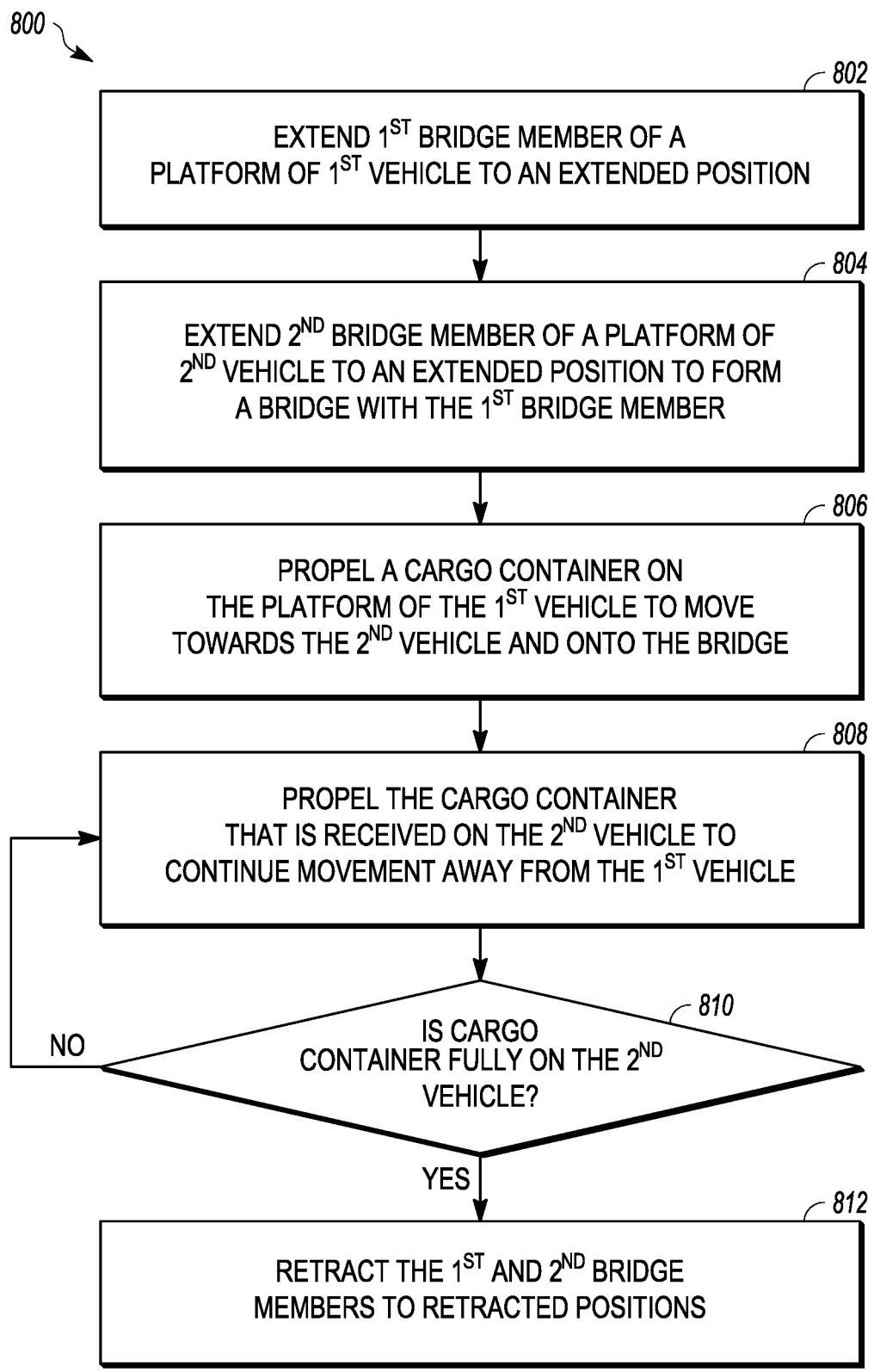
FIG. 8 is a flow chart of a method for cargo transloading on a vehicle system according to an embodiment.

FIG. 8 is a flow chart of a method 800 for cargo transloading on a vehicle system according to an embodiment. The method outlines control steps that can be used and/or performed by the controller of a transloading control system, such as in FIG. 5, to implement a transloading operation. The method may include more steps, fewer steps, and/or different steps than shown in FIG. 8.

At step 802, a first bridge member of a platform of a first vehicle is extended to an extended position, relative to a chassis of the first vehicle. The extension may be accomplished by controlling one or more bridge actuators of the first vehicle to force the first bridge member to project beyond a first end of the chassis, above a coupler of the first vehicle, and towards a second vehicle that is connected to the first vehicle via the coupler. The first bridge member is located closer to the second vehicle when in the extended position than in the retracted position.

At step 804, a second bridge member of a platform of the second vehicle is extended to an extended position, relative to a chassis of the second vehicle. The second bridge member may be extended by controlling one or more bridge actuators of the second vehicle. The second bridge member may engage and secure to the first bridge member to form a bridge between the vehicles above the couplers.

At step 806, a cargo container on the platform of the first vehicle is propelled to move along a top side of the platform towards the second vehicle and onto the bridge. The cargo container may be propelled by powered rollers of a roller system disposed along the top side of the platform. The roller system optionally may include passive, non-powered rollers. The bridge members may include one or more rollers. The cargo container may be translated without lifting the cargo container off the first vehicle or requiring the use of offboard transloading equipment. At step 808, the cargo container that extends onto the platform of the second vehicle is propelled in the same direction to continue movement away from the first vehicle until the entire cargo container is supported by the second vehicle. For example, the second vehicle may include powered rollers disposed along the top side of the platform to pull the cargo container onto the second vehicle.

At step 810, a determination is made whether the cargo container is fully onboard the second vehicle, such that the first vehicle is no longer underneath and/or supporting the weight of the cargo container. The determination may be informed via the use of one or more sensors. Suitable sensors include weight sensors that indicate the amount of force exerted on the top side of the platform of the first vehicle and/or the second vehicle, optical sensors, proximity sensors, position sensors, and the like.

If the cargo container is not fully onboard the second vehicle, then the method returns to steps 806 and 808 to continue moving the cargo container. On the other hand, if the cargo container is confirmed as onboard the second vehicle and offboard the first vehicle, then flow continues to step 812. At step 812, the first and second bridge members are retracted from the extended positions to respective retracted positions. As a result, a gap is formed between the platforms of the vehicles that enables the vehicle system to turn and travel along curves without the two platforms abutting and/or unduly limiting the permitted turning radius. Optionally, the method may include decoupling the first vehicle from the second vehicle and then propelling the second vehicle with the cargo container to travel along a route while the first vehicle is left behind.

The embodiments described above disclose transloading of a single container. Some containers, such as intermodal containers, can be stacked on top of each other. The transloading vehicles may be capable of transloading stacked containers that are locked together one on top of the other.

The embodiments described above disclose a bridge formed by two interlocking bridge members of two different transloading vehicles. Alternatively, or in addition, a bridge member of a transloading vehicle may be capable of extending the full distance to an adjacent vehicle. The bridge may be established entirely by the one bridge member. The bridge member may releasably secure to the (non-extended) platform of the neighboring vehicle. In another alternative embodiment, one or more of the transloading vehicles may only have a bridge member at one end of the chassis, instead of respective bridge members at both ends. Furthermore, other shapes for the non-linear profiles of the bridge members and base platforms are contemplated than the shapes shown in FIGS. 4A and 4B. For example, the bridge members may have more than one protruding portion along the lateral profile.

The embodiments described herein are applicable to railcars as well as trailers that can travel on roads and paths.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions for the system. During operation of one embodiment, a determination can occur by processing the inputs through a machine learning/AI process. In one example, the parameters of the neural network may generate a value at the output node designating that action as the desired action. This action may translate into a signal that causes the equipment to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In an embodiment, a vehicle is provided that includes a chassis, a coupler, and a platform on the chassis. The coupler is mounted to the chassis at a first end of the chassis and is configured to releasably connect the vehicle to a second vehicle. The platform is for supporting a cargo container and includes a base portion and a bridge member. The bridge member is located at an end of the platform and is extendable relative to the base portion from a retracted position to an extended position to lengthen the platform. The bridge member in the extended position projects beyond the first end of the chassis, above the coupler, towards the second vehicle for establishing a bridge to transload the cargo container from the platform to the second vehicle.

Optionally, the platform includes an array of roller devices mounted along a top surface of the platform and configured to engage the cargo container. At least some of the roller devices in the array may be selectively powered to rotate in a direction that forces the cargo container to move along the platform towards the second vehicle when the bridge member is in the extended position.

Optionally, the bridge member bidirectionally moves between the retracted position and the extended position along a linear path. Optionally, the bridge member is coupled to one or more bridge actuators that power movement of the bridge member between the retracted position and the extended position. Optionally, an inner edge of the bridge member has a first non-linear profile, and an outer edge of the base portion of the chassis has a second non-linear profile that complements the first non-linear profile of the inner edge of the bridge member.

Optionally, the vehicle is a rail-based vehicle and lacks propulsion-generating equipment onboard the vehicle.

Optionally, the bridge member is a first bridge member and the coupler is a first coupler. The vehicle may further include a second coupler mounted to the chassis at a second end of the chassis opposite the first end. The platform may include a second bridge member located at a second end of the platform such that the base portion of the platform is between the first and second bridge members. The second bridge member may be extendable relative to the base portion to lengthen the platform. The second bridge member in an extended position of the second bridge member may project beyond the second end of the chassis towards a third vehicle connected to the second coupler for establishing a bridge to transload the cargo container from the platform to the third vehicle.

Optionally, the vehicle also includes one or more sensors onboard the vehicle and a controller comprising one or more processors and operably connected to the one or more sensors. The one or more sensors are configured to generate sensor data indicative of a presence or absence of the cargo container on the platform. The controller is configured to generate a control signal, responsive to the sensor data indicating that the cargo container is no longer on the platform of the vehicle, to one or more of update a record of a location of the cargo container, update a weight distribution of a vehicle system that includes at least the vehicle and the second vehicle, retract the bridge member to the retracted position, or actuate the coupler to disconnect the vehicle from the second vehicle.

Optionally, the base portion of the platform includes a first set of deck members and a second set of deck members. The deck members in the first set are configured to extend, relative to the second set of deck members, in a first side-loading direction to project beyond a first side of the chassis. The deck members in the second set are configured to extend, relative to the first set of deck members, in a second side-loading direction to project beyond a second side of the chassis.

In an embodiment, a vehicle system is provided that includes a first vehicle and a second vehicle connected to each other via first and second couplers, respectively. Each of the first and second vehicles includes a platform and one or more bridge actuators. The one or more bridge actuators are connected to a bridge member at an end of the platform to move the bridge member, relative to a base portion of the platform, from a retracted position to an extended position in which the bridge member projects above the first and second couplers. The vehicle system also includes a controller including one or more processors and operably connected to the one or more bridge actuators of each of the first and second vehicles. The controller is configured to generate a control signal to control the one or more bridge actuators of the first and second vehicles to extend the bridge members to the extended position. The bridge members in the extended position mechanically connect to each other to form a bridge above the first and second couplers for transloading a cargo container from the platform of the first vehicle to the platform of the second vehicle.

Optionally, the platform of each of the first and second vehicles includes an array of roller devices mounted along a top surface of the platform and configured to engage the cargo container. At least some of the roller devices in the array of each of the first and second vehicles may be powered rollers. The controller may be configured to activate the powered rollers to rotate in a direction that forces the cargo container to move from the first vehicle across the bridge to the second vehicle. The controller may be configured to verify that the bridge member of the first vehicle is connected to the bridge member of the second vehicle to form the bridge prior to activating the powered rollers to rotate in the direction that forces the cargo container to move across the bridge.

Optionally, the controller is configured to control the one or more bridge actuators of each of the first and second vehicles to retract the respective bridge member to the retracted position after verifying that the cargo container is fully supported by the platform of the second vehicle.

Optionally, in response to determining that the cargo container is in a fully loaded position onboard the platform of the second vehicle, the controller is configured to generate a control signal to one or more of: (i) update a record of a location of the cargo container, (ii) update a weight distribution of a vehicle system that includes at least the first vehicle and the second vehicle, or (iii) actuate at least one of the first coupler or the second coupler to disconnect the first vehicle from the second vehicle.

Optionally, the one or more bridge actuators of each of the first and second vehicles are configured to bidirectionally move the bridge member between the retracted position and the extended position along a linear path.

In an embodiment, a method for vehicle transloading of cargo is provided. The method includes controlling one or more bridge actuators of a first vehicle to extend a bridge member of a platform of the first vehicle from a retracted position to an extended position. The bridge member in the extended position projects beyond a first end of a chassis of the first vehicle, above a coupler of the first vehicle, and towards a second vehicle that is connected to the first vehicle via the coupler. The bridge member is disposed closer to the second vehicle when in the extended position than when in the retracted position to form at least a portion of a bridge between the platform of the first vehicle and a platform of the second vehicle for transloading a cargo container between the first and second vehicles.

Optionally, the method also includes controlling one or more power roller devices along a top surface of the platform to rotate in a direction that forces the cargo container on the platform of the first vehicle to move along the platform in a direction towards the second vehicle for the cargo container to move along the bridge above the coupler.

Optionally, the method also includes controlling the one or more bridge actuators of the vehicle to retract the bridge member to the retracted position responsive to determining that the cargo container is fully onboard the second vehicle.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A transloading control system comprising:
a platform configured to be mounted on a chassis of a vehicle for supporting a cargo container, the platform comprising a base portion and a bridge member, the bridge member located at an end of the base portion and extendable relative to the base portion from a retracted position to an extended position to lengthen the platform, the bridge member in the extended position projecting beyond a first end of the chassis above a coupler mounted to the chassis and configured to releasably connect the vehicle to a second vehicle, the bridge member configured to extend into a gap between the vehicle and the second vehicle, the bridge member configured to move relative to the base portion towards the second vehicle for establishing a bridge across at least a portion of the gap between the vehicle and the second vehicle while supporting a first portion of the cargo container to transload the cargo container from the platform to the second vehicle, and wherein the base portion is configured to support a second portion of the cargo container while the bridge member moves toward the second vehicle and away from the base portion.

2. The transloading control system of claim 1, wherein the platform includes an array of roller devices mounted along a top surface of the platform and configured to engage the cargo container.

3. The transloading control system of claim 2, wherein at least some of the roller devices in the array are selectively powered to rotate in a direction that forces the cargo container to move along the platform towards the second vehicle when the bridge member is in the extended position.

4. The transloading control system of claim 2, wherein at least one roller device in the array is operably coupled with the bridge member, the at least one roller device configured to separate from other roller devices of the array of rollers devices while the bridge member is in the extended position.

5. The transloading control system of claim 2, wherein the cargo container is configured to separate from at least some of the roller devices in the array responsive to the bridge member moving to the extended position.

6. The transloading control system of claim 2, wherein at least some of the roller devices in the array are operably coupled with the base portion of the platform, wherein a linear position of each of the at least some of the roller devices relative to the chassis is configured to remain unchanged while the bridge member is in the extended position.

7. The transloading control system of claim 1, wherein the bridge member bidirectionally moves between the retracted position and the extended position along a linear path.

8. The transloading control system of claim 1, wherein the bridge member is coupled to one or more bridge actuators that power movement of the bridge member between the retracted position and the extended position.

9. The transloading control system of claim 8, wherein the one or more bridge actuators are one or more linear actuators configured to control bidirectional movement of the bridge member along a linear path.

10. The transloading control system of claim 1, wherein an inner edge of the bridge member has a first non-linear profile, and an outer edge of the base portion of the chassis has a second non-linear profile that complements the first non-linear profile of the inner edge of the bridge member.

11. The transloading control system of claim 1, wherein the vehicle is a rail-based vehicle and lacks propulsion-generating equipment onboard the vehicle that is configured to propel the vehicle.

12. The transloading control system of claim 1, further comprising:
one or more sensors configured to be disposed onboard the vehicle and to generate sensor data indicative of a presence or absence of the cargo container on the platform; and
one or more processors operably connected to the one or more sensors, the one or more processors configured to generate a control signal responsive to the sensor data indicating that the cargo container is no longer on the platform of the vehicle, the control signal generated to one or more of update a record of a location of the cargo container, update a weight distribution of a vehicle system that includes at least the vehicle and the second vehicle, retract the bridge member to the retracted position, or actuate the coupler to disconnect the vehicle from the second vehicle.

13. A transloading control system, comprising:
a platform configured to be mounted on a chassis of a vehicle for supporting a cargo container, the platform comprising a base portion and a first bridge member, the first bridge member located at an end of the platform proximate a first end of the chassis and extendable relative to the base portion from a retracted position to an extended position to lengthen the platform, the first bridge member in the extended position projecting beyond the first end of the chassis above a first coupler mounted to the chassis and configured to releasably connect the vehicle to a second vehicle, the first bridge member configured to extend into a gap between the vehicle and the second vehicle, the first bridge member configured to move towards the second vehicle for establishing a bridge across at least a portion of the gap between the vehicle and the second vehicle to transload the cargo container from the platform to the second vehicle,
the vehicle further comprising a second coupler mounted to the chassis at a second end of the chassis opposite the first end, the platform further comprising a second bridge member located at a second end of the platform such that the base portion of the platform is between the first and second bridge members, the second bridge member extendable relative to the base portion to lengthen the platform, wherein the second bridge member in an extended position of the second bridge member projects beyond the second end of the chassis towards a third vehicle connected to the second coupler for establishing a bridge to transload the cargo container from the platform to the third vehicle.

14. A transloading control system, comprising:

a platform configured to be mounted on a chassis of a vehicle for supporting a cargo container, the platform comprising a base portion and a bridge member, the bridge member located at an end of the platform proximate a first end of the chassis and extendable relative to the base portion from a retracted position to an extended position to lengthen the platform, the bridge member in the extended position projecting beyond the first end of the chassis above a coupler mounted to the chassis and configured to releasably connect the vehicle to a second vehicle, the bridge member configured to extend into a gap between the vehicle and the second vehicle, the bridge member configured to move towards the second vehicle for establishing a bridge across at least a portion of the gap between the vehicle and the second vehicle to transload the cargo container from the platform to the second vehicle, wherein the base portion also is configured to extend in one or both of a first side-loading direction to project beyond a first side of the chassis or a second side-loading direction to project beyond a second side of the chassis.

15. A transloading control system comprising:

a platform configured to be mounted on a chassis of a first vehicle, the platform comprising a base portion and a bridge member that is at an end of the platform;

one or more bridge actuators connected to the bridge member to move the bridge member relative to the base portion from a retracted position to an extended position in which the bridge member projects above a coupler of the first vehicle;

one or more processors operably connected to the one or more bridge actuators, the one or more processors configured to generate a control signal to control the one or more bridge actuators to extend the bridge member to the extended position, wherein the bridge member is configured to mechanically connect to a second bridge member of a second vehicle while in the extended position to form a bridge across a portion of a gap between the first and second vehicles;

an array of roller devices mounted to the platform and configured to engage a cargo container, wherein at least some of the roller devices in the array are powered rollers and the one or more processors are configured to activate the powered rollers to rotate in a direction that moves the cargo container across the bridge; and wherein the one or more processors are configured to verify that the bridge member of the first vehicle is connected to the second bridge member of the second vehicle to form the bridge prior to activating the powered rollers to rotate in the direction that forces the cargo container to move across the bridge.

16. The transloading control system of claim 15, wherein the one or more processors are configured to control the one or more bridge actuators of the first vehicle to retract the bridge member to the retracted position after verifying that the cargo container is supported by a platform of the second vehicle.

17. The transloading control system of claim 15, wherein, in response to determining that the cargo container is in a fully loaded position onboard a platform of the second vehicle, the one or more processors are configured to generate a control signal to one or more of: (i) update a record of a location of the cargo container, (ii) update a weight distribution of a vehicle system that includes at least the first vehicle and the second vehicle, or (iii) actuate the first coupler to disconnect the first vehicle from the second vehicle.

* * * * *